United States Patent
Cao et al.

(10) Patent No.: US 7,299,228 B2
(45) Date of Patent: Nov. 20, 2007

(54) LEARNING AND USING GENERALIZED STRING PATTERNS FOR INFORMATION EXTRACTION

(75) Inventors: Yunbo Cao, Beijing (CN); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 475 days.

(21) Appl. No.: 10/733,541

(22) Filed: Dec. 11, 2003

(65) Prior Publication Data

US 2005/0131896 A1    Jun. 16, 2005

(51) Int. Cl.
    G06F 17/30    (2006.01)
(52) U.S. Cl. .......................................... 707/6
(58) Field of Classification Search ............... 707/1, 707/6, 10; 709/310, 100
    See application file for complete search history.

(56) References Cited

U.S. PATENT DOCUMENTS 5,606,690 A *   2/1997   Hunter et al. .................. 707/5
6,785,417 B1 *  8/2004   Williamson et al. .......... 382/186

OTHER PUBLICATIONS

Nicholas Jr. et al., BioTechniques, vol. 28, No. 6, pp. 1174-1191, 2000.*
Eskin et al., Journal of Computational Biology, vol. 10, No. 2, pp. 187-213, Apr. 2003.*
Yangarber et al., Applied Natural Language Conferences Proceedings of the Sixth Conference On Applied Natural Language Processing, Seattle, Washington, 2000, pp. 282-289.*
Soderland S., Maching Learning, Kluwer Academic Publishers, vol. 34, pp. 233-272, 1999.*
Ravichandran et al., Proceedings of the 40th Annual Meeting of the Association for Computational Linguistics (ACL), Philadelphia, Jul. 2002, pp. 41-47.*
Hull et al., Computers and The Humanities 21, pp. 103-118, 1987.*
Mulslea et al., Autonomous Agent and Multi-Agent Systems, Kluwer Academic Publishers, 4, 93-114, 2001.*
Ahonen, O. Heinonen and M. Klemettinen, 1998 "Applying Data Mining Techniques for Descriptive Phrase Extraction in Digital Document Collections". In Proceedings of Advances in Digital Libraries Conference, pp. 1-10.
R. Agrawal and R. Srikant, 1994. "Mining Sequential Patterns" In Proceedings of the 20th International Conference on Very Large Databases, p. 1-12.
S. Brin, 1998. "Extracting Patterns and Relations from the World Wide Web". In Proceedings of the WebDB Workshop at 6th International Conference on Extending Database Technology, pp. 1-12.
B. Lent, R. Agrawal and R. Srikant, 1997. "Discovering Trends in Text Databases". In Proceedings of the 3rd International Conference on knowledge Discovery and Data Mining, p. 1-5.

(Continued)

Primary Examiner—Cheyne D. Ly
(74) Attorney, Agent, or Firm—Todd R. Fronek; Westman, Champlin & Kelly, P.A.

(57) ABSTRACT

The present invention relates to extracting information from an information source. During extraction, strings in the information source are accessed. These strings in the information source are matched with generalized extraction patterns that include words and wildcards. The wildcards denote that at least one word in an individual string can be skipped in order to match the individual string to an individual generalized extraction pattern.

16 Claims, 5 Drawing Sheets

OTHER PUBLICATIONS

D. Lin and P. Pantel, 2001. "DIRT-Discovery of Inference Rules from Text". In Proceedings of ACM SIGKDD Conference on Knowledge Discovery and Data Mining, 2001, p. 1-6.

H. Mannila and H. Toivonen, 1996. "Discovering Generalized Episodes Using Minimal Occurences". In Proceedings of the 2nd International Conference on Knowledge Discovery and Data Mining, pp. 1-6.

D. Ravichandran E. Hovy. "Learning Surface Text Patterns for a Question Answering System". In Proceedings of the 40th Annual Meeting of the Association for Computational Linguistics, pp. 1-7.

E. Riloff, 1996. "Automatically Generating Extraction Patterns from Untagged Text". In Proceedings of the 13th National Conference on Artificial Intelligence, pp. 1-6.

S. Soderland, D. Fisher, J. Aseltine and W. Lehnert, 1995. "Crystal: Inducing a Conceptual Dictionary". In Proceedings of the 14th International Joint Conference on Artificial Intelligence, pp. 1-6.

R. Srikant and R. Agrawal, 1996. "Mining Sequential Patterns: Generalizations and Performance Improvements". In Proceedings of the 5th International Conference on Extending Database Technology, EDBT, pp. 1-31.

K. Sudo, S. Sekine and R. Grishmam, 2001. "Automatic Pattern Acquistition for Japanese Information Extraction". In Proceedings of Human Language Technologies, 2001, pp. 1-7.

E. Voorhees, 2001. "Overview of the Question Answering Track". In Proceedings of the TREC-10 Conference. NIST, Gaithersburg, MD, 157-165, pp. 1-10.

* cited by examiner

LEARNING AND USING GENERALIZED STRING PATTERNS FOR INFORMATION EXTRACTION

BACKGROUND OF THE INVENTION

The present invention relates to information extraction. In particular, the present invention relates to systems and methods for performing information extraction.

Many databases, web pages and documents exist that contain a large amount of information. With such a large amount of existing information, many methods have been used in order to gather relevant information pertaining to a particular subject. Information extraction refers to a technique for extracting useful information from these information sources. Generally, an information extraction system extracts information based on extraction patterns (or extraction rules).

Manually writing and developing reliable extraction patterns is difficult and time consuming. As a result, many efforts have been made to automatically learn extraction patterns from annotated examples. In some automatic learning systems, natural language patterns are learned by syntactically parsing sentences and acquiring sentential or phrasal patterns from the parses. Another approach discovers patterns using syntactic and semantic constraints. However, these approaches are generally costly to develop. Another approach uses consecutive surface string patterns for extracting information on particular pairs of information. These consecutive patterns only cover a small amount of information to be extracted and thus do not provide sufficient generalization of a large amount of information for reliable extraction.

Many different methods have been devised to address the problems presented above. A system and method for accurately and efficiently learning patterns for use in information extraction would further address these and/or other problems to provide a more reliable, cost effective information extraction system.

SUMMARY OF THE INVENTION

The present invention relates to extracting information from an information source. During extraction, strings in the information source are accessed. These strings in the information source are matched with generalized extraction patterns that include words and wildcards. The wildcards denote that at least one word in an individual string can be skipped in order to match the individual string to an individual generalized extraction pattern.

Another aspect of the present invention is a computer-readable medium for extracting information from an information source. The medium includes a data structure that has a set of generalized extraction patterns including words and an indication of a position for at least one optional word. The medium also includes an extraction module that uses the set of the generalized extraction patterns to match string in the information source with the generalized extraction patterns.

Yet another aspect of the present invention is a method of generating patterns for use in extracting information from an information source. The method includes establishing a set of strings including at least two elements corresponding to a subject. A set of generalized extraction patterns are generated that correspond to the set of strings. The generalized extraction patterns include at least two elements, words and an indication of a position of at least one optional word.

Another method of generating patterns for use in extracting information from an information source relates to the present invention. The method establishes a set of strings including at least two elements corresponding to a subject and identifying consecutive patterns within the set of strings that include words and the at least two elements. A set of generalized extraction patterns is generated from the consecutive patterns identified. The generalized extraction patterns include the at least two elements, words and wildcards. The wildcards express a combination of the consecutive patterns.

DETAILED DESCRIPTION OF ILLUSTRATIVE EMBODIMENTS

The present invention relates to information extraction. Although herein described with reference to development of patterns for information extraction, the present invention may also be applied to other types of information processing. Prior to discussing the present invention in greater detail, one embodiment of an illustrative environment in which the present invention can be used will be discussed.

Figure 1:
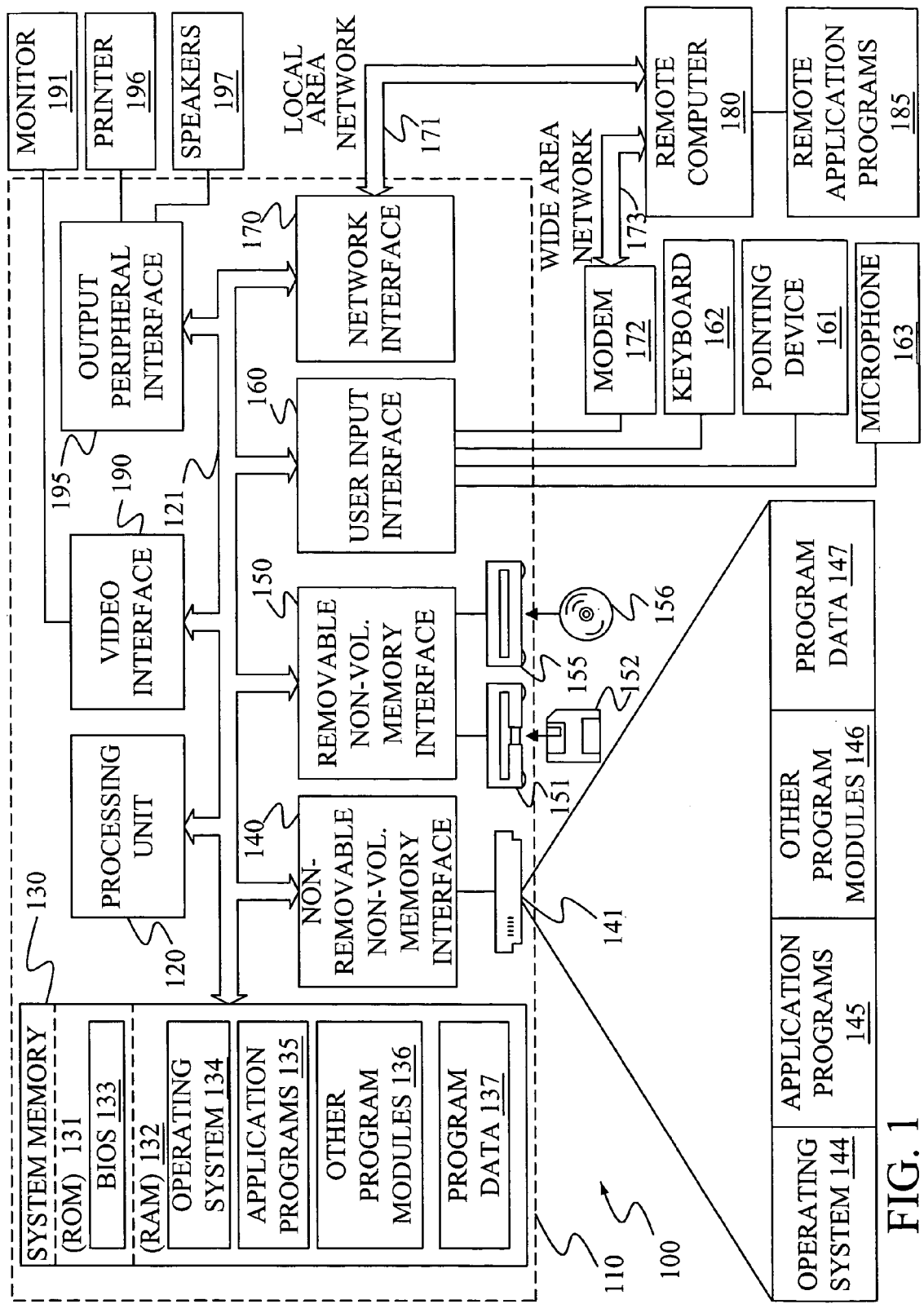
FIG. 1 is a diagram of an exemplary computing system environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available medium or media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
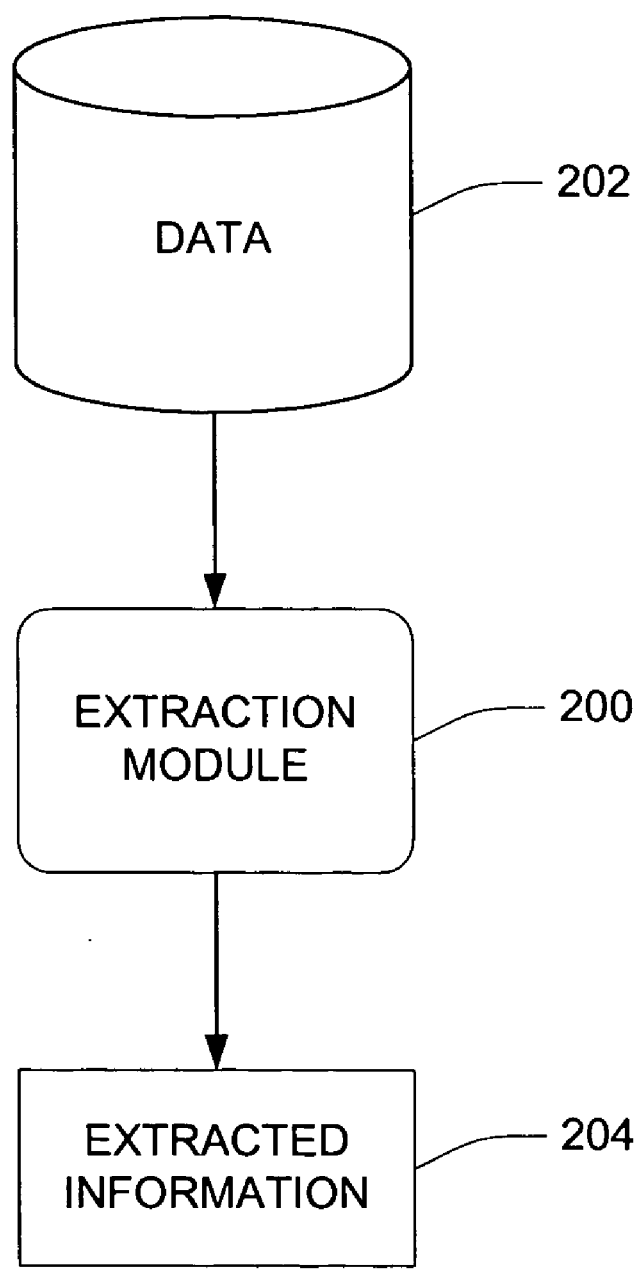
FIG. 2 is a flow diagram of information extraction.

FIG. 2 illustrates an extraction module 200 that extracts information from a database 202 and provides an output of extracted information 204. As will be discussed below, extraction module 200 operates based on extraction patterns learned from a training or test corpus. As appreciated by those skilled in the art, extraction module 200 may include the extraction patterns and/or access a data structure having the patterns to perform extraction. The extraction patterns match strings in database 202 during extraction. In an exemplary embodiment of the present invention, the extraction patterns include words, elements and wildcards generated based on a training corpus. As used herein, strings include a sequence of words and words can be of different languages including English, German, Chinese and Japanese. Elements are variables containing information related to a particular subject and wildcards are indications that denote that words in a string can be skipped and/or a position for optional words during matching. Database 202 can be a variety of different information sources. For example, database 202 may be a collection of documents, news group articles, a collection of customer feedback data, and/or any other type of information and stored on a local system or across a wide area network such as the Internet. The information can be in text or other form, including for example speech data that can be converted to text. The extracted information 204 can be excerpts from a plurality of documents related to a particular subject that may be reviewed or further processed in order to better analyze data in database 202.

Information extraction is concerned with extracting information related to a particular subject. Extracted information can include pairs, triplets, etc. of related elements pertaining to the subject. For example, when extracting product release information, the elements can include a company element and a product element. If the subject relates to books, the elements can include a book title and author information. Other related elements can include inventor and invention information, question and answer pairs, etc. In general, one or more of the elements associated with a subject can be referred to as an "anchor", which will typically signal that the information in an string is associated with a particular subject. For example, a product can be an anchor in a company/product pair related to product release information. One aspect of the present invention relates to generating patterns that include elements for extraction.

Figure 3:
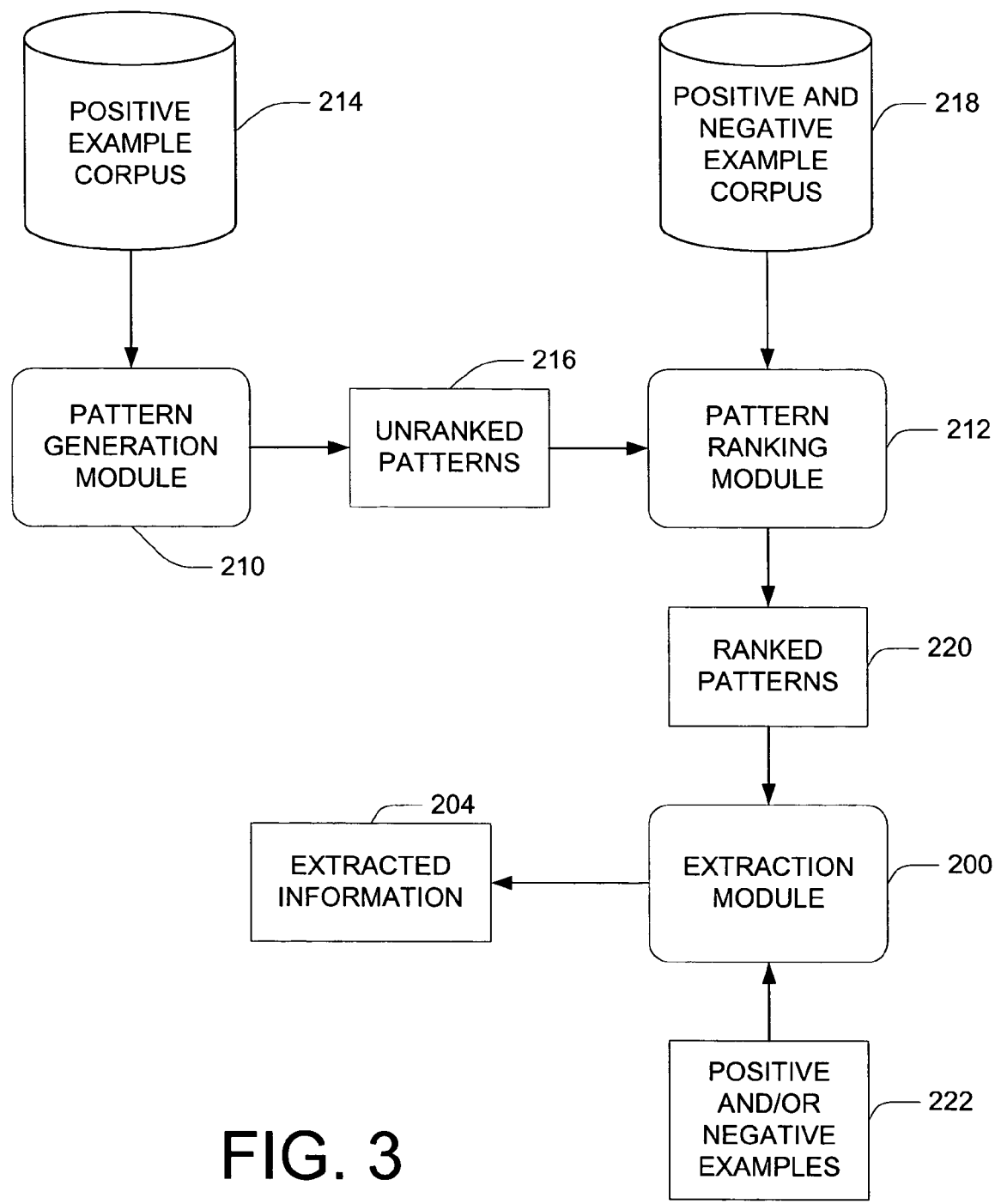
FIG. 3 is a flow diagram for generating and ranking patterns for information extraction.

FIG. 3 illustrates a flow diagram of various modules for developing patterns to be used by extraction module 200. The modules include a pattern generation module 210 and a pattern ranking module 212. Pattern generation module 210 develops patterns based on a positive example corpus 214. The positive example corpus contains strings of text that include elements related to a subject of information to be extracted. Using the positive examples in corpus 214, consecutive patterns are generated by module 210. Additionally, pattern generation module 210 can use wildcards to express combinations of patterns. As a result, the pattern(s) generated by module 210, which is indicated at 216, represents a combination that includes a generalized string.

Below are example training instances that form part of an exemplary corpus 214. The instances include company and product elements annotated with <company> and <product> tags, respectively. The positive training instances in corpus 214 are:

<company> Microsoft Corp. </company> today announced the immediate availability of <product> Microsoft Internet Explorer Plus </product>, the eagerly awaited retail version of Internet Explorer 4.0.

<company> Microsoft Corp. </company> today announced the availability of <product> Microsoft Visual J++ 6.0 Technology Preview 2</product>, a beta release of the next version of the industry's most widely used development system for Java.

<company> Microsoft Corp. </company> today announced the immediate, free availability of <product> Microsoft Visual InterDev 6.0 March pre-release </product>, a preview of the new version of the leading team-based Web development system for rapidly building data-driven Web applications.

Given the positive training instances, consecutive patterns can be identified that contain the elements related to the subject. For example, the following three patterns represent consecutive patterns generated from the instances above, where the variables <company> and <product> have replaced specific company and product information:

<company> today announced the immediate availability of <product>,

<company> today announced the availability of <product>,

<company> today announced the immediate, free availability of <product>.

Given these consecutive patterns, a generalized extraction pattern expressing the elements of the consecutive patterns containing a wildcard can be developed by module 210 such as:

<company> today announced the {\w+3} availability of <product>.

Here, the wildcard {\w+3} denotes that up to three words can be skipped between "the" and "availability". The generalized extraction pattern above "covers" each of the consecutive patterns, that is each consecutive pattern can be expressed in terms of the generalized extraction pattern. Using the generalized extraction pattern with the wildcard, the product information "Microsoft Office 60 Minute Intranet Kit Version 2.0" will be extracted from the following sentence since the pattern allows skipping of the words "immediate worldwide" without the need for an additional consecutive pattern including the words "immediate worldwide":

<company> Microsoft Corporation </company> today announced the immediate worldwide availability of Microsoft Office 60 Minute Intranet Kit version 2.0, downloadable for free (connect-time charges may apply) from the Office intranet Web site located at http://www.microsoft.com/office/intranet/.

Pattern generation module 210 provides an output of unranked patterns 216 generated from corpus 214 that include wildcards to pattern ranking module 212 such as described above. Pattern ranking module 212 ranks the patterns received from pattern generation module 210 using a positive and negative example corpus 218. A negative example contains one element in a pair but does not contain a second element, for instance the anchor described above. For example, the sentence below is a negative example because it contains company information, but does not include a specific product and is not related to a product release:

<company> Microsoft Corp. </company> today announced the availability of an expanded selection of Web-based training through its independent training providers.

The patterns obtained from pattern generation module 210 can be ranked by pattern ranking module 212 using a number of different methods. In one method, the precision of a particular pattern P can be calculated by dividing the number of correct instances extracted from corpus 218 divided by the number of instances extracted from corpus 218 using pattern P. A pattern with a higher precision value is ranked higher by pattern ranking module 212. Additionally, patterns may be removed if a corresponding pattern matches all the positive instances that a corresponding pattern can match. The pattern having the lower precision value can then be removed.

Ranked patterns 220 form the basis for extraction using extraction module 200. Positive and/or negative examples 222 can then be used to evaluate the performance of extraction module 200 in providing correct and useful extracted information 204. During extraction, patterns that rank higher can be used first to match strings in database 202. In one embodiment, matching is performed in a left-to-right order. For example, in the pattern "x\w+y\w+", occurrences of x are matched and then any occurrences of y are matched.

Figure 4:
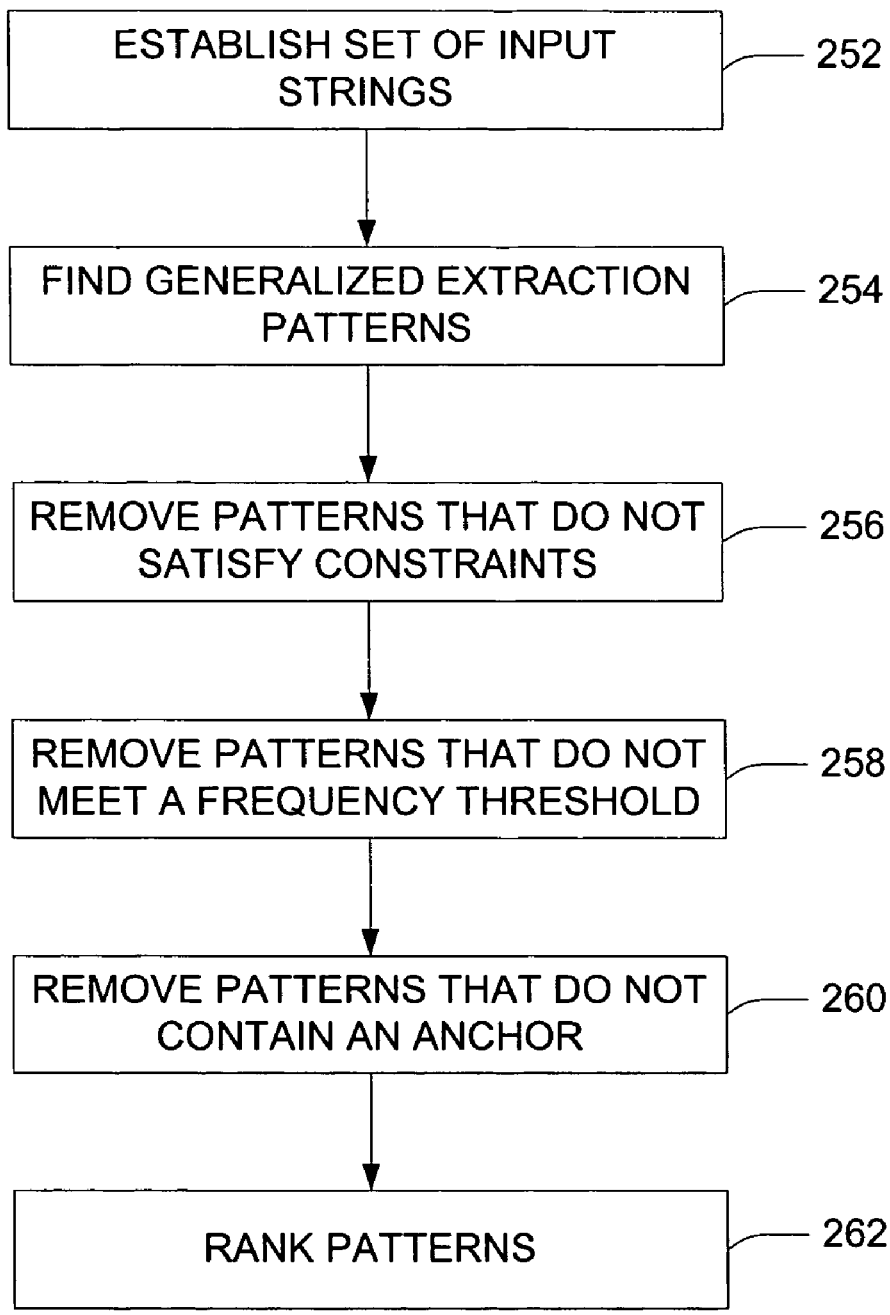
FIG. 4 is a method for generating and ranking generalized extraction patterns.

FIG. 4 illustrates a method 250 for generating and ranking patterns to be used by extraction module 200. Method 250 is based on what is known as the Apriori Algorithm. The Apriori Algorithm is founded on the basis that subsets and associated supersets share similar attributes and a combination of subsets and supersets can be expressed to encompass characteristics of both the subsets and supersets. The following algorithm can be used to generate generalized extraction patterns, which will be described in more detail below with regard to method 250. In the algorithm provided below, S is a set of input strings (i.e. positive example corpus 214), $P_1$ are the set of words in S, $p_1$ is an individual word in $P_1$. $P_i$ and $P_{(i-1)}$ are sets of patterns for the $i^{th}$ iteration of the algorithm and $p_i$ and $p_{(i-1)}$ represent patterns within the $i^{th}$ set.

---

Learn Generalized Extraction Patterns with Constraints Algorithm

---

1. S = set of positive example input strings;
2. $P_1$ = set of words in S;
3. for (i=2;i≦k;i++){
4.    $P_i$=find-generalized-extraction-patterns ($P_{(i-1)}$,$P_1$);
5.    for each (p∈$P_i$){
6.      if ( not satisfy-constraints(p) )
7.        remove p from $P_i$;
8.      if (p' s frequency is not larger than a threshold)
9.        removep from$P_i$;
10.      if (pdoes not contain <anchor>)
11.        removep from$P_i$;
12.    }
13.    if ( $P_i$ is empty )
14.      Goto line 16;
15. }
16.    output P=$U^i_{j=2}P_j$;

---

Method 250 begins at step 252, where a set of input strings is established. The set of input strings is the positive example corpus 214 in FIG. 3. The set of input strings includes patterns, in the case of a pair of elements, where both portions of a desired pair of information elements are included. After the set of input strings is established, generalized extraction patterns including wildcards are generated at step 254. Generating the generalized extraction pattern (which is also the sub-algorithm find-generalized-extraction-patterns( ) in the algorithm above) is discussed in further detail below with regard to FIG. 5. The generalized extraction patterns include words and elements in addition to the wildcards that denote other words may appear within the pattern.

The generalized extraction patterns can then be evaluated to determine whether or not they represent reliable candidates for extraction. At step 256, patterns that do not satisfy constraints are removed. A number of different constraints can be used to remove generalized extraction patterns generated by pattern generation module 210. One constraint is referred to as a "boundary constraint" wherein a wildcard cannot immediately be positioned before or after an anchor. This constraint helps eliminate patterns for which it is difficult to determine where the anchor information begins and ends. For example, the following generalized extraction pattern would be removed:

<company> today announced the immediate availability {\w+3} <product>

The above generalized extraction pattern could inappropriately determine that the string "of Internet Explorer for no-charge download from the Internet" was a product for the following sentence:

Microsoft Corp. today announced the immediate availability of Internet Explorer for no-charge download from the Internet.

Another constraint is the "distant constraint". The distant constraint limits the number of words that can be skipped by a wildcard to not be larger than the largest number of words that are skipped based on the training data. For example, the following pattern that does not limit the amount of words to be skipped would not be used:

<company> {\w+} today announced {\w+} deliver <product>.

The above pattern could incorrectly extract "enterprise and electronic-commerce solutions based on the Microsoft Windows NT Server operating system and the BackOffice family of products" as product information for the sentence:

Microsoft Corp. and Policy Management Systems Corp. (PMSC) today announced a plan in which the two companies will work together to deliver enterprise and electronic-commerce solutions based on the Microsoft Windows NT Server operating system and the BackOffice family of products.

Another constraint, called the "island constraint" prohibits what is referred to as an "isolated function word". Isolated function words are generally articles such as "the", 'a', and "an" that do not include specific content related to information to be extracted and are surrounded by wildcards. The following pattern does not satisfy the island constraint:

<company> {\w+8} the {\w+13} of the <product>, the first

The above pattern could incorrectly extract "Microsoft Entertainment Pack for the Windows CE operating system" as product information that is not related to a release for the following sentence:

Microsoft Corp. today provided attendees of the Consumer Electronics Show in Las Vegas with a demonstration of the Microsoft Entertainment Pack for the Windows CE operating system, the first game product to be released for the Windows CE-based handheld PC platform.

At step 258, patterns that do not meet a frequency threshold are removed. As a result, patterns that are not commonly used are removed at this step. At step 260, patterns that do not contain an anchor are removed. For example, a pattern not containing a product with an associated company name is not included as a pattern for information extraction. Given these patterns, the patterns are ranked at step 262. As discussed above, many different ranking methods can be used to rank the patterns. If patterns rank too low, they can be removed.

Figure 5:
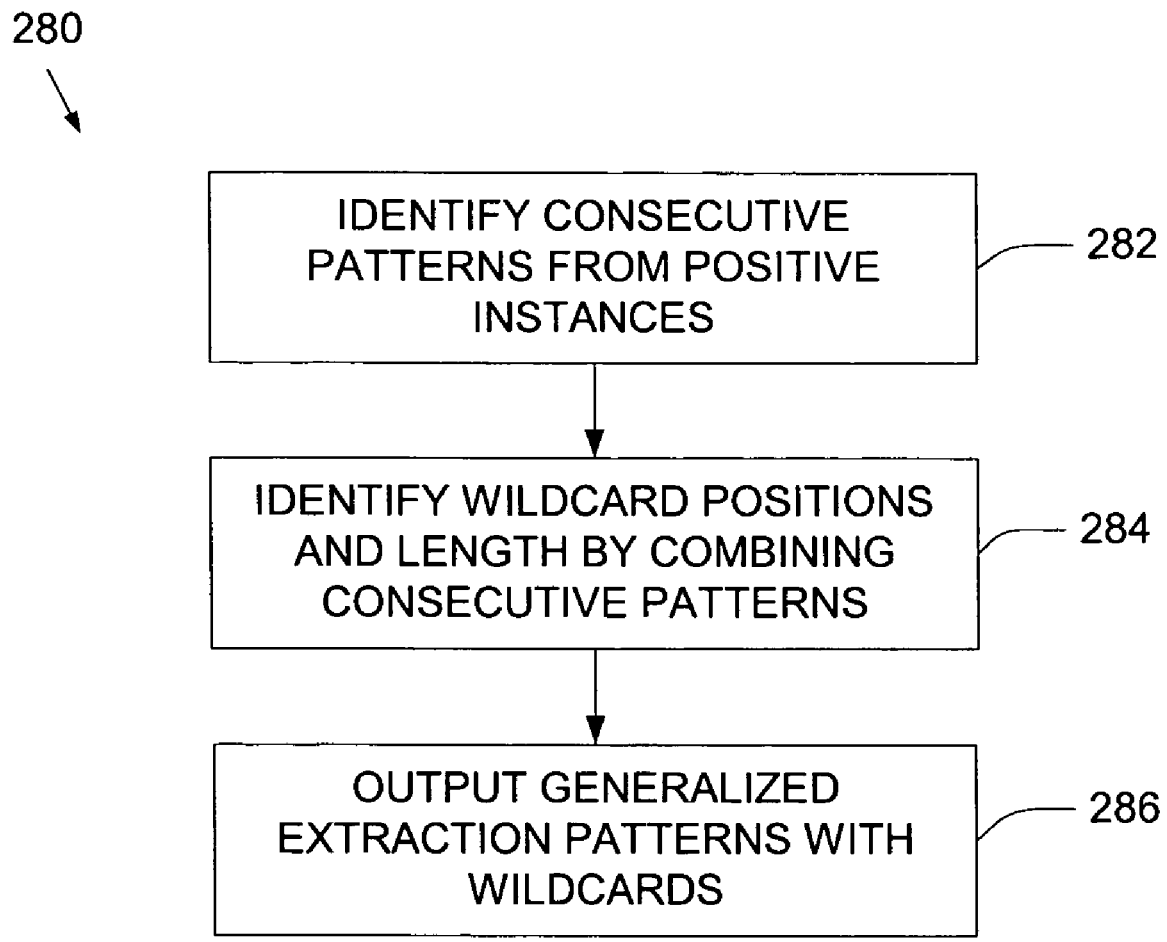
FIG. 5 is a method for generating generalized extraction patterns.

FIG. 5 illustrates method 280 for generating generalized extraction patterns. The algorithm below can be used to generate these patterns, and is a sub-algorithm for the algorithm described above. The same variables apply to the algorithm below.

find-generalized-extraction-pattern($P_{(i-1)}, P_1$)

1. for each $(p_{(i-1)} \in P_{(i-1)})\{$
2.   for each $(p_1 \in P_1)\{$
3.     $p_i = p_{(i-1)} p_1$;
4.     if ($p_i$ exists in S)
5.       put $p_i$ into $P_i$;
6.     $p'_i = p_{(i-1)}\{\backslash w+n\}p_1$;
7.     if ($p'_i$ exists in S)
8.       put $p'_i$ into $P_i$;
9.   }
10. }
11. output $P_i$;

At step 282 of method 280, consecutive patterns are identified from the positive instances in positive example corpus 214. This step corresponds to lines 3 through 5 in the sub-algorithm above. The consecutive patterns include the elements related to the subject to be extracted, for example company and product. In one method, patterns can be recursively generated given the input strings by combining subsets and supersets of the strings sharing similar attributes. After the consecutive patterns have been identified, method 280 proceeds to step 284 wherein wildcard positions and lengths are identified by combining the consecutive patterns and expressing generalized extraction patterns to cover the consecutive patterns. This step corresponds to lines 6 through 8 in the sub-algorithm above. Next, the generalized extraction patterns with wildcards are output at step 286. The generalized extraction patterns are then further analyzed as explained above with respect to method 250 to remove and rank the patterns.

By implementing the present invention described above, generalized extraction patterns can be developed that represent combinations of patterns and provide a more reliable information extraction system. The generalized extraction patterns can include positions for optional words and/or wildcards denoting that words can be skipped during matching that allow combinations of patterns to be expressed. Using the generalized patterns during extraction allows for matching of various strings in order to identify matching strings in an information source.

Although the present invention has been described with reference to particular embodiments, workers skilled in the art will recognize that changes may be made in form and detail without departing from the spirit and scope of the invention.

What is claimed is:

1. A computer-implemented method of extracting information from an information source comprising a plurality of documents, comprising:

generating generalized extraction patterns, wherein the generalized extraction patterns express elements of consecutive patterns containing a wildcard, wherein the consecutive patterns specify a number of words in an individual string can be skipped in order to match the individual string to an individual generalized extraction pattern;

accessing strings of text in the information source;

comparing the strings of text in the information source to the generalized extraction patterns and identifying a plurality of strings in the information source that match at least one generalized extraction pattern, the generalized extraction patterns including related elements pertaining to a subject, at least one word and at least one wildcard, wherein the at least one word and at least one wildcard are positioned between the related elements and wherein the at least one wildcard denotes that at least one word and up to the specified number of words in an individual string can be skipped in order to match the individual string to an individual generalized extraction pattern;

extracting a first set of related elements of text pertaining to the subject from a first string of the plurality of strings based on the related elements pertaining to the subject in the at least one generalized extraction pattern, the first string being associated with a first document in the plurality of documents;

extracting a second set of related elements of text pertaining to the subject from a second string of the plurality of strings based on the related elements in the at least one generalized extraction pattern, the second string being associated with a second document in the plurality of documents, wherein at least one of the related elements of text in the first set of related elements is different from each of the related elements of text in the second set of related elements of text;

and outputting the first set of related elements and the second set of related elements.

2. The computer-implemented method of claim 1 and further comprising processing the first related set of elements and the second set of related elements to analyze data in the information source.

3. The computer-implemented method of claim 1 wherein for at least one of the corresponding elements in each of the generalized extraction patterns, there is at least one word positioned between said at least one of the corresponding elements and the wildcards.

4. A computer-readable storage medium for extracting information from an information source comprising a plurality of documents, comprising:

a data structure including a set of generalized extraction patterns, wherein the generalized extraction patterns express elements of consecutive patterns containing a wildcard, wherein the consecutive patterns specify a number of words in an individual string can be skipped in order to match the individual string to an individual generalized extraction pattern, further, including related elements pertaining to a subject, at least one word and at least one wildcard, wherein the at least one word and at least one wildcard are positioned between the related elements and wherein the at least one wildcard denotes that the at least one word and up to the specified number of words in an individual string can be skipped in order to match the individual string to an individual generalized extraction pattern; and an extraction module using the set of generalized extraction patterns to match a first string and a second string in the information source with one of the generalized extraction patterns, the first string associated with a first document in the plurality of documents and the second string associated with a second document in the plurality of documents, extract a first set of related elements of text pertaining to the subject from the first string based on the related elements in said one of the generalized extraction patterns and a second set of related elements of text pertaining to the subject from the second string based on the related elements in said one of the generalized extraction patterns, wherein at least one of the related elements of text in the first set of related elements is different from each of the related elements of text in the second set of related elements of text, and output the first of related elements and the second set of related elements.

5. The computer-readable storage medium of claim 4 and further comprising a module adapted to process the first set of related elements of text and the second set of related elements of text.

6. The computer-readable storage medium of claim 4 wherein for the generalized extraction patterns there is at least one word positioned between at least one of the elements and the indication.

7. The computer-implemented method of claim 1 wherein each of the elements of the first set of related elements of text are different from each of the elements of the second set of related elements of text.

8. The computer-implemented method of claim 1 wherein the corresponding related set of elements refer to general elements pertaining to the subject and the first set of related elements and the second set of related elements refer to specific text associated with the general elements.

9. The computer-implemented method of claim 8 wherein the corresponding related set of general elements include at least one of a company/product pair, a book title/author pair, an inventor/invention information pair and a question/answer pair.

10. The computer-implemented method of claim 9 wherein the first set of related elements and the second set of related elements refer to at least one of a specific company, a specific product, a specific book title, a specific author, a specific inventor, a specific invention, a specific question and a specific answer.

11. The computer-implemented method of claim 1 wherein the plurality of documents include at least one of a collection of documents, news articles and a collection of customer feedback.

12. The computer-readable storage medium of claim 4 wherein each of the elements of the first set of related elements of text are different from each of the elements of the second set of related elements of text.

13. The computer-readable storage medium of claim 4 wherein the corresponding related set of elements refer to general elements pertaining to the subject and the first set of related elements and the second set of related elements refer to specific text associated with the general elements.

14. The computer-readable storage medium of claim 13 wherein the corresponding related set of general elements include at least one of a company/product pair, a book title/author pair, and inventor/invention pair and a question/answer pair.

15. The computer-readable storage medium of claim 14 wherein the first set of related elements and the second set of related elements refer to at least one of a specific company, a specific product, a specific book title, a specific author, a specific inventor, a specific invention, a specific question and a specific answer.

16. The computer-readable storage medium of claim 4 wherein the plurality of documents include at least one of a collection of documents, news articles and a collection of customer feedback.

* * * * *